May 30, 1967   M. E. PALMQUIST ETAL   3,322,029
PHOTOGRAPHIC ENLARGER AND PRINTER
Filed Nov. 10, 1964   3 Sheets-Sheet 1
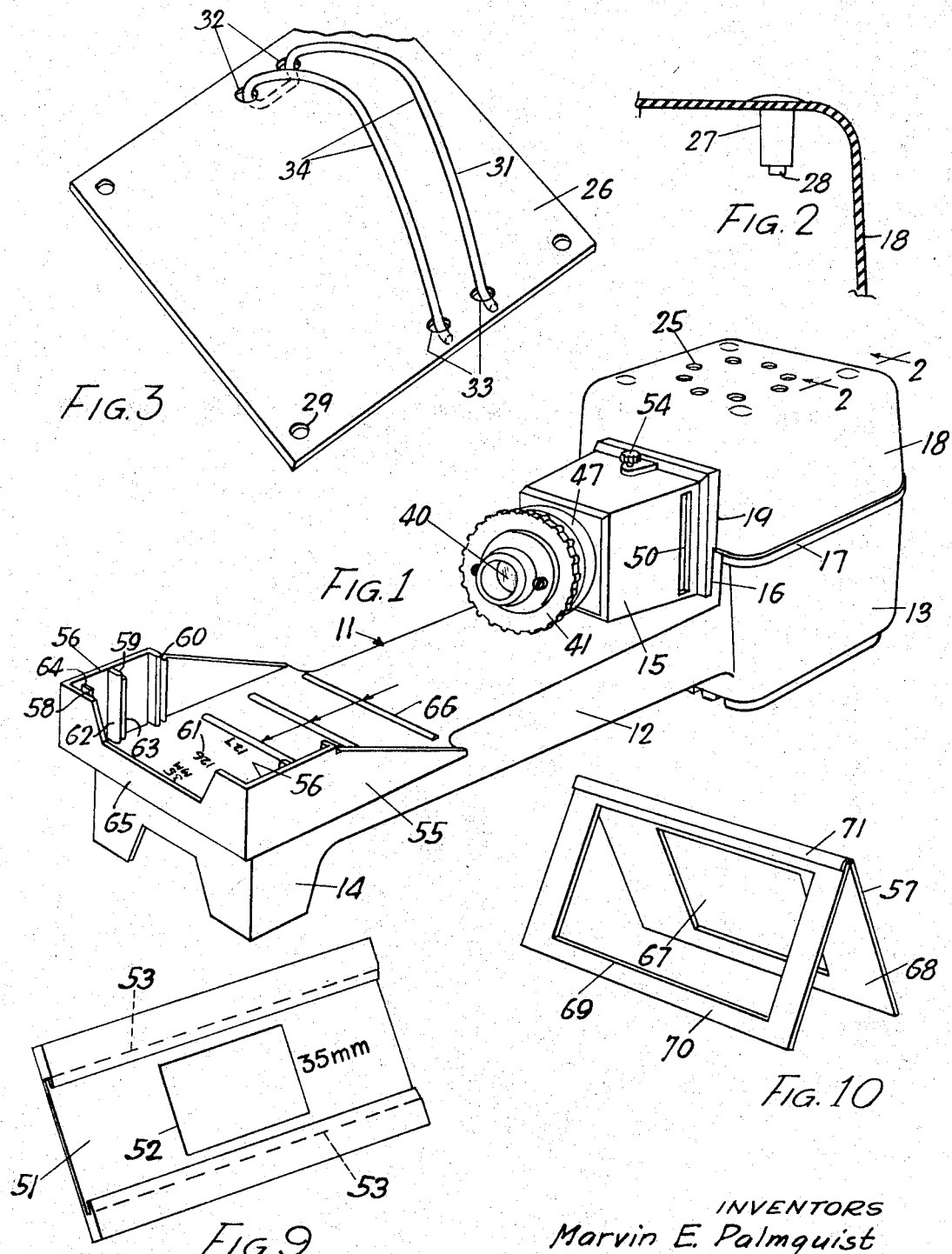
INVENTORS
Marvin E. Palmquist
Arthur C. Haggstrom
ATT'Y.

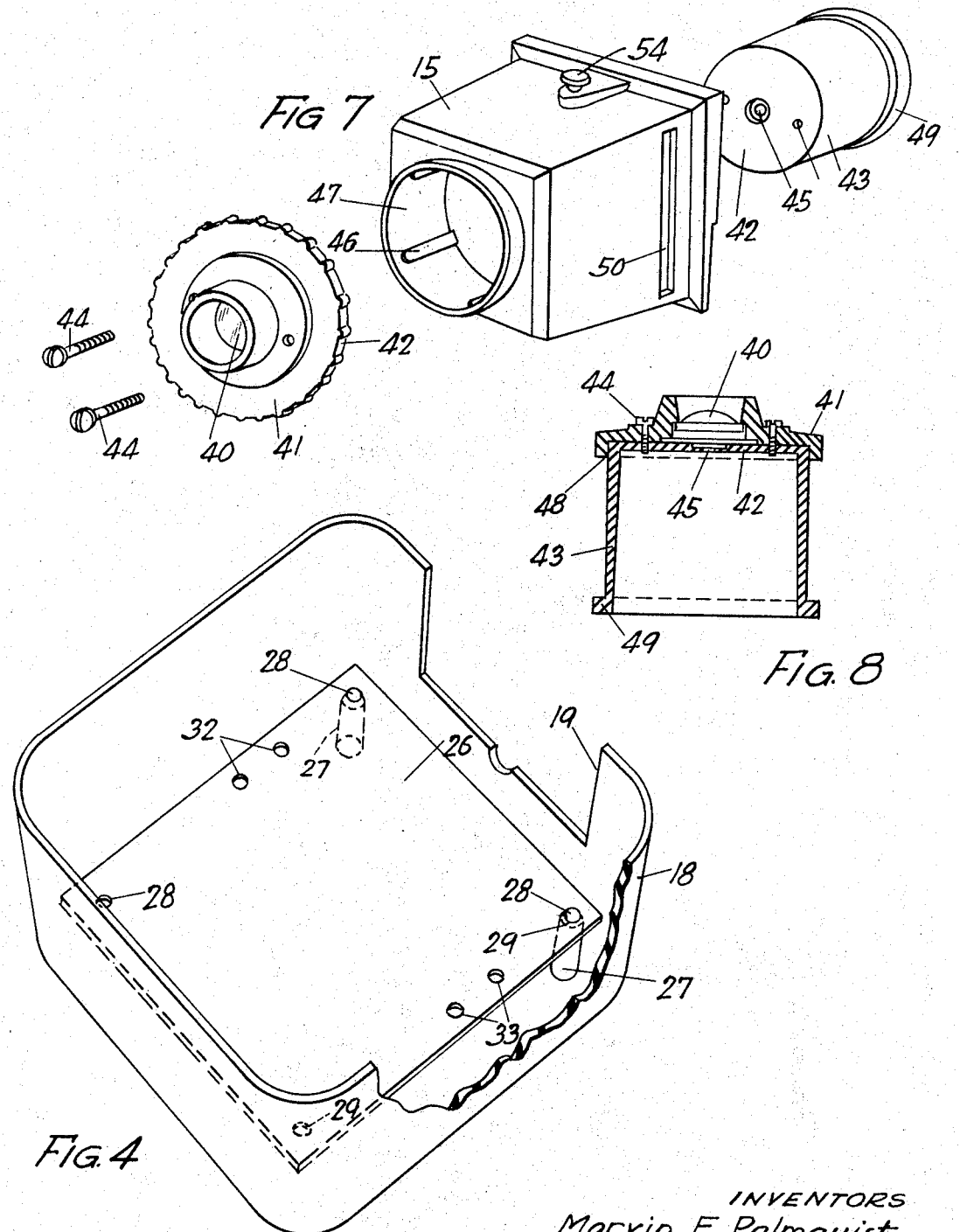

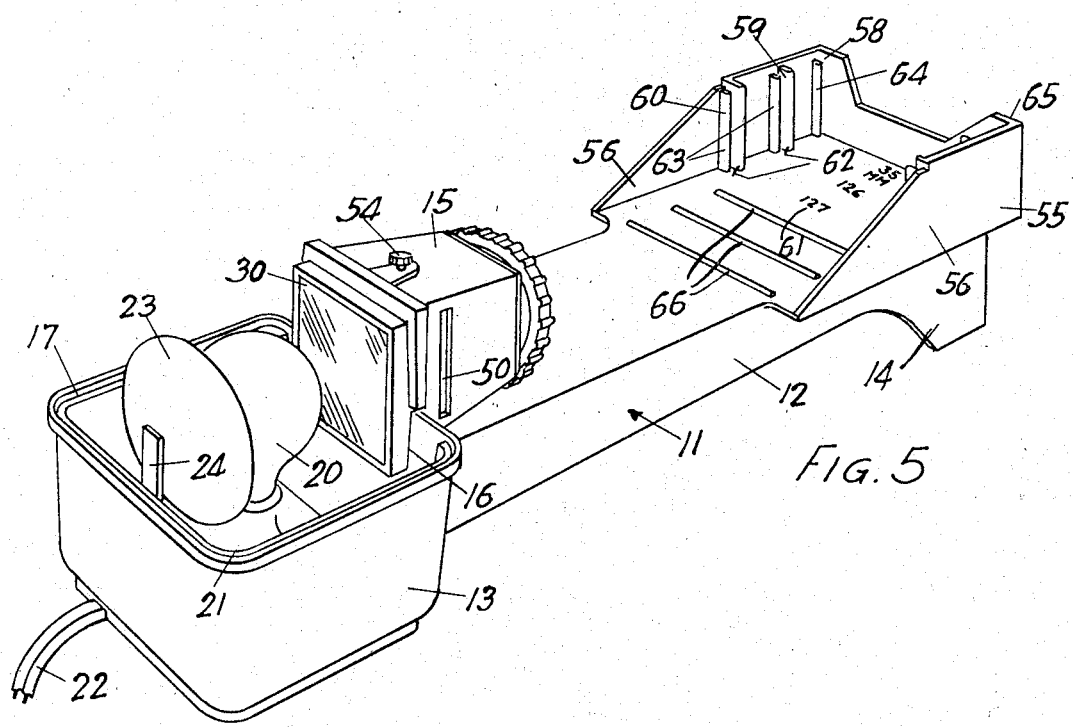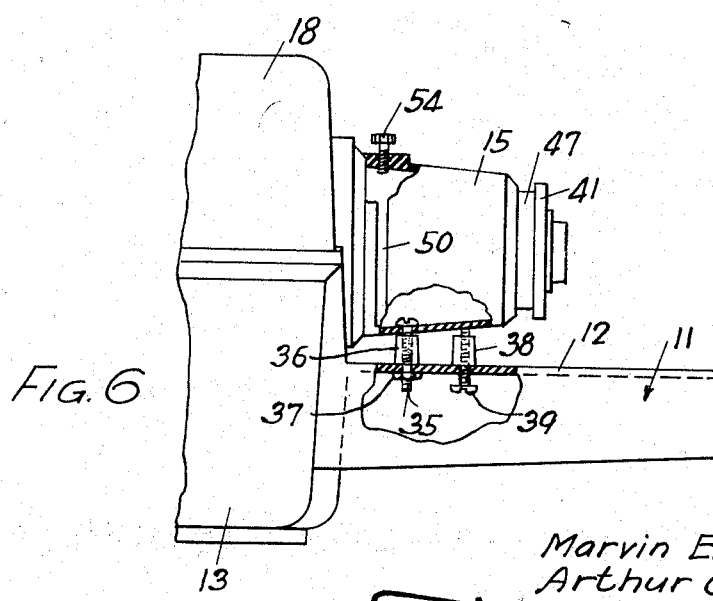

United States Patent Office 3,322,029
Patented May 30, 1967

---

3,322,029
PHOTOGRAPHIC ENLARGER AND PRINTER
Marvin E. Palmquist and Arthur C. Haggstrom, Rockford, Ill., assignors to Cherry Valley Manufacturing Corp., Rockford, Ill., a corporation of Illinois
Filed Nov. 10, 1964, Ser. No. 410,219
10 Claims. (Cl. 88—24)

Our invention relates to a photographic enlarger and printer of improved design and construction.

The device of our invention includes the following novel features:

(1) The elongated horizontal frame has at its forward end upwardly projecting vertical side walls having longitudinally spaced parallel guides thereon for the print paper frame, wherein the frame can be set for 127 film, 126 film and 35 mm. film, the settings for these requiring three different distances from the lens, one for each of the three different films mentioned in the projector slide, three different slides being provided to fit the three different films;

(2) The aforementioned guides have their front walls narrower than the back walls and lower at their upper ends to enable easier entry of the print paper frame more or less by feel when working in the dark room;

(3) The lens carrier of the projector is slidable on a horizontal axis giving automatic focus for a 35 mm. film with the lens carrier pushed all the way in and likewise for 127 film with the lens carrier pulled out, the lens carrier being adjustable between these two extremes to an intermediate position for good focus for 126 film;

(4) A vertically adjustable screw is provided on the frame under the projector housing for minute tilting adjustment of the front end vertically relative to the frame to obtain any desired vertical adjustment of the image in relation to the paper;

(5) A contractile type of U-shaped wire spring clip is provided inside the cover of the light box which slides down easily over the light bulb to pull the cover down snugly in a recess in the top of the box to prevent the escape of any stray light that might fog the printing paper during the exposure, and (6) Light deflecting ribs are provided in evenly spaced parallel relation transversely of the frame in front of the guides for the print paper to cut off reflection off the frame onto the paper, regardless of which set of guides is being used.

The invention is illustrated in the accompanying drawings, in which—

FIG. 1 is a perspective view of the photographic enlarger and printer embodying all of the improvements of our invention;

FIG. 2 is an enlarged sectional detail of the light box cover on the line 2—2 of FIG. 1 showing the molded integral projections for supporting the reflector plate that is shown in perspective in FIG. 3 carrying the spring clip for holding the cover down on the light box;

FIG. 4 is a perspective view of the cover inverted to show the reflector plate installed therein but omitting the spring clip;

FIG. 5 is a perspective view similar to FIG. 1 but from the other end and with the cover removed, showing the light bulb and the reflector behind it, and also showing the light diffusing glass of special plastic in front of it in the open back of the projector housing;

FIG. 6 is a side view of the enlarger and printer showing both the vertical bolt for fastening the projector housing to the frame and the vertically adjustable screw under the projector housing for tiltably adjusting it at the front end vertically relative to the frame for close vertical adjustment of the image on the paper;

FIG. 7 is an exploded perspective view of the projector housing and its slidably adjustable lens carrier;

FIG. 8 is a longitudinal section through the lens carrier assembled;

FIG. 9 is a perspective view of a film carrier slide that is slidable through slots in the opposite side walls of the projector housing and is adapted to be clamped from above by means of the set screw on the top of the housing, and FIG. 10 is a perspective view of the print paper frame adapted to be inserted in either of the three sets of guides on the front end of the frame, showing it opened.

The same reference numerals are applied to corresponding parts throughout these views.

The photographic enlarger and printer of our invention is indicated generally by the reference numeral 11 in FIGS. 1 and 5 and comprises an elongated horizontal frame 12 of molded plastic material with a light box 13 integral with one end and legs 14 on the other end for support of the frame on a table or other support in a dark room. The light box 13 has the projector housing 15 (also of molded plastic) projecting horizontally from its front wall and entered in the cut-out portion 16 thereof, and there is an annular recess 17 defined in the top of this box in which the cover 18 of molded plastic material has a loose fit, it also having the front wall thereof provided with a cutout portion 19 to fit over the rear end portion of the projector housing 15 behind a shoulder on the housing. An electric light bulb 20 is mounted in a socket 21 secured to the bottom wall of the light box 13 and having an extension cord 22 connected therewith for connection with any suitable electrical outlet, the cord 22 including a switch (not shown) to enable easily turning the light on and off as desired. Housed in the box 13 behind the bulb 20 is also a reflector 23 supported on a vertical arm 24 suitably secured to the bottom wall of the box 13. Ventilation holes 25 are provided in the top wall of the cover 18, and a combination light shield and reflector plate 26 is mounted in spaced parallel relation to the top wall of the cover on studs 27 that are suitably molded integral with the cover and have reduced end portions 28 that are pressed into holes 29 provided in the corner portions of the plate 26, as shown in FIG. 4, thereby allowing free circulation of air in the cover and box without allowing any light to escape, the light striking plate 26 being reflected downwardly so that a good portion of it will be reflected off the light bulb toward the light diffusing "glass" 30 of special plastic that is mounted in the open rear end of the projector housing 15. The main reflection, however, is that obtained by the dished reflector 23 disposed behind the light bulb 20. A generally U-shaped bowed spring wire clip 31 is mounted on the reflector plate 26 in the manner shown in FIG. 3, with the closed end entered in a pair of closely spaced holes 32 and the open end retained in another pair of spaced holes 33 so as to hold the bowed middle portions 34 of the legs of the U in spaced parallel relation but adapted to be easily spread apart enough to start entry of the light bulb 20 therebetween, whereby to hold the cover 18 down quite snugly in the recess 17 when this spring clip, sliding toward the smaller diameter portion of the bulb near the socket 21, causes the cover 18 to be pulled downwardly by the contractile force of this spring 31 bearing on opposite sides of the bulb 20, thereby preventing any stray light escaping that might fog the printing paper during exposure. A bolt 35 extends vertically downwardly from the bottom wall of the projector housing 15 through a hollow vertical boss 36 that is molded integral with the frame 12 and this bolt receives a nut 37 on its lower end. A shorter hollow vertical boss 38 is also molded integral with the frame 12 in forwardly spaced parallel relation to the boss 36 and has an adjusting screw 39 threaded therein and adjustable vertically from below the frame against the bottom of the projector housing 15, whereby to adjust the elevation of the front end of the housing to a small extent to obtain the desired increased vertical adjustment of the image in relation to the printing paper prior to exposure in the operation of the enlarger and printer, the single bolt mounting at 35 being rockable enough to permit this kind of adjustment, only a very small fraction of an inch adjustment being usually needed at 39 to obtain as much as a ¼" or more change in elevation of the image on the paper.

The light converging lens 40 of the projector is suitably mounted in a circular cap 41 that is secured to the front wall 42 of a cylindrical carrier sleeve 43, as by means of screws 44 entered through registering holes in the cap 41 and wall 42, a small central circular light aperture 45 being provided in the front wall 42 in coaxial relation to the lens 40. The lens carrier 43 is slidable axially on bearing pads 46 in the horizontally disposed collar 47 provided on the front wall of the projector housing 15, this collar being of a predetermined length in relation to the length of the sleeve 43 between the rim 48 on the cap 41 and an annular shoulder 49 provided on the inner end of the sleeve so as to allow a predetermined fore and aft axial adjustment of the lens carrier in relation to the projector housing 15 to give automatic focus for a 35 mm. film with the lens carrier pushed all the way in and likewise for 127 film with the lens carrier pulled all the way out, the lens carrier being adjustable axially between these two extremes to an intermediate position for good focus for 126 film.

Vertical slots 50 are provided in registering relation in the opposite side walls of the projector housing 15 near the rear thereof in closely spaced parallel relation to the light diffusing glass 30 previously mentioned, and these slots are adapted to receive interchangeably three different film carrier slides similar to the one shown at 51 in FIG. 9, that one happening to be for the 35 mm. film and having the correct size of rectangular aperture 52 provided therein in accurately spaced parallel relation to the opposed grooves 53 in which the 35 mm. film is slidably received for adjustment of one exposure after another in the aperture 52. The other two film carrier slides are of the same outside dimensions but have different sizes of apertures. Once the correct film carrier slide has been entered in the slots 50 with the aperture therein properly centered relative to the projector housing 15, a set screw 54 that is threaded vertically in the top wall of the projector housing in the same vertical plane with the slots 50 can be tightened to engage the top of the carrier slide and thus clamp it in its correctly set position, thereby avoiding any likelihood of the carrier slide being accidentally shifted in either direction longitudinally and spoiling what would otherwise be a good enlargement.

On the front end of the frame 12 is a three-sided open top box 55 molded integral with the frame and providing parallel upwardly projecting vertical side walls 56, on the inner sides of which are molded integral therewith longitudinally spaced parallel vertical guides for interchangeable entry therein of the print paper frame indicated at 57 in FIG. 10, the frame being set at the farthest distance from lens 40 in guides 58 for the 35 mm. film, in guides 59 at an intermediate distance for 126 film, and in guides 60 for the shortest distance for 127 film. The proper setting for the paper holder 57 is plainly indicated by the numbers "35 mms". "126" and "127" which are imprinted on the top of the frame 12 adjacent these guides, as indicated at 61 in FIG. 5. Each of these guides 59 and 60 is defined by a vertical rear flange 62 and a vertical front flange 63 both molded integral with the side walls 56 in spaced parallel relationship, the forward flange 62 in each case being wider and longer than the rear flange 63 so as to facilitate entry of the holder 57 in these guides more or less by a sense of feel when working in the dark room, the inner edges of the front flanges 62 being offset appreciably with respect to the inner edges of the rear flanges 63, and the upper end of the rear flanges 63 being offset downwardly appreciably with respect to the upper ends of the front flanges 62. A similar effect is obtained for the guides 58 by having the flanges 64 in spaced parallel relation to the front end wall 65 and with the upper ends of these flanges in downwardly offset relation to the top of the end wall 65.

A further improvement is the provision of light deflecting ribs 66 in spaced parallel relationship to one another molded integral with the top wall of the frame 12 transversely thereof and all in rearwardly spaced relation to the guides 58–60. These ribs stand up about an eighth of an inch and are spaced approximately the same distance apart as the guides 58–60. They serve to prevent reflection of light off the top of the frame 12 with the frame 57 in either of its three settings, so that much clearer and sharply defined prints can be produced.

In operation, the operator, knowing which of the three films mentioned, namely, 35 mm., 126 or 127, is to be used, inserts the paper holder 57 in the proper set of guides 58, 59 or 60, using the smaller aperture 67 in leaf 68 for 127 film prints and using the larger aperture 69 in leaf 70 for 35 mm. film prints, the holder having the two leaves 68 and 70 hingedly connected by fabric as shown at 71 and adapted to be inserted in the guides 58–60 with either side of the holder toward the projector, depending on which of the apertures 67 and 69 is to be used. The film carrier slide 51 selected depends, of course, on which of the three kinds of film is being used. The slide 51 with the film inserted in grooves 53 is entered in the slots 50 and, after a test on plain white paper indicates whether the image is properly centered with respect to the aperture 67 or 69, the screw 54 is tightened to clamp the slide and thereby make certain that the slide will not shift out of position during the exposure. If the operator finds that the image is not at the right level, it is a simple matter for him to adjust the screw 39 so as to tilt the projector housing 15 a trifle to obtain the proper elevation of the image before the exposure. Sharp focus is assured automatically if the operator is careful to push the lens carrier 43 in for enlargements made from 35 mm. film, and to pull it out for enlargements made from 127 film. It is only when 126 film is used that the operator has to determine by adjustment an intermediate position where sharp focus is obtained.

The all-plastic construction of frame 12, cover 18, projector housing 15, and lens carrier 43 makes for lightness, durability and economy, as well as assurance of exact alignment of parts indefinitely and freedom from rusting. The use of special plastic for the light diffusing glass 30 is of advantage not only because of its ability to withstand heat better than glass would when placed so close to the light bulb but also because it eliminates the danger of glass breakage in shipment and handling later in the use of the device. And, of course, the plastic construction of the device otherwise gives these same advantages.

It is believed the foregoing description conveys a good understanding of the objects and advantages of our invention. The appended claims have been drawn to cover all legitimate modifications and adaptations.

We claim:

1. In an apparatus for the enlarging of photographs, the combination of a projection apparatus, which includes a light converging lens in an elongated tubular carrier that is slidably mounted in an opening provided in a substantially vertical wall on the front end of a projector housing, the rear end of which is disposed in front of a fixed light source, the lens carrier having projecting shoulders on its opposite ends for limiting its fore and aft adjustment relative to said housing wall and being movable from one extreme pulled out position in which the lens is focused automatically for one kind of film on paper set at one predetermined distance from the front of the projector housing to another extreme pushed in position in which the lens is focused automatically for another kind of film on paper set at another predetermined distance from the front of the projector housing, the lens carrier being manually shiftable between the two extreme positions for focusing for a third kind of film on paper set at a third predetermined distance from the front of the projector housing, film holder slide means for the three kinds of film, guide means on the projector housing for selectively mounting a film holder slide at a predetermined distance from the lens between the lens and light source in transverse relation to the light beam, and other means for holding sensitized paper at the three predetermined distances from the front end of the projector housing.

2. In an apparatus for the enlarging of photographs, the combination of a projection apparatus, which includes a light converging lens in an elongated tubular carrier that is slidably mounted in an opening provided in a substantially vertical wall on the front end of a projector housing, the rear end of which is disposed in front of a fixed light source, the lens carrier having projecting shoulders on its opposite ends for limiting its fore and aft adjustment relative to said housing wall and being movable from one extreme pulled out position in which the lens is focused automatically for one kind of film on paper set at one predetermined distance from the front of the projector housing to another extreme pushed in position in which the lens is focused automatically for another kind of film on paper set at another predetermined distance from the front of the projector housing, film holder slide means for the two kinds of film, guide means on the projector housing for selectively mounting a film holder slide at a predetermined distance from the lens between the lens and light source in transverse relation to the light beam, and other means for holding sensitized paper at the two predetermined distances from the front end of the projector housing.

3. Apparatus as set forth in claim 2 including an elongated horizontal frame having a flat top surface, said horizontal frame mounting the projector housing and light source on one end portion thereof and mounting the sensitized paper holding means on the other end portion, said frame having horizontally spaced parallel upwardly projecting light deflecting ribs on the flat top surface transversely of said frame intermediate its ends.

4. Apparatus as set forth in claim 1 including an elongated horizontal frame having a flat top surface, said horizontal frame mounting the projector housing and light source on one end portion thereof and mounting the sensitized paper holding means on the other end portion, said frame having upwardly projecting light deflecting ribs on the flat top surface transversely of said frame intermediate its ends, there being three of said ribs in horizontally spaced parallel relation, each in a predetermined rearwardly spaced relation to the paper holder in the three settings thereof.

5. Apparatus as set forth in claim 2 including an elongated horizontal frame mounting the projector housing and light source on one end portion thereof and mounting the sensitized paper holding means on the other end portion, said apparatus including a screw vertically adjustable in the frame under the projector housing to tilt its forward lens carrying end by small increments slightly upwardly relative to the frame to adjust an image to an increased degree relative to the sensitized paper.

6. Apparatus as set forth in claim 2 including an elongated horizontal frame mounting the projector housing and light source on one end portion thereof and mounting the sensitized paper holding means on the other end portion, said apparatus including means fixing the rear end portion of said housing in a predetermined vertically spaced relation to said frame, and a screw vertically adjustable in the frame under the projector housing in forwardly spaced relation to the last named means to tilt its forward lens carrying end by small increments slightly upwardly relative to the frame to adjust an image to an increased degree relative to the sensitized paper.

7. In an apparatus for the enlarging of photographs comprising a horizontal elongated frame, and projector means on one end portion, including a light converging lens in a projector housing with a light source and means for mounting a film supporting slide in the housing between the lens and light source, the improvement which consists in the provision of a plurality of fixed pairs of guides for a sensitized paper holder on the other end portion of said frame, said guides being disposed vertically in a fixed spaced parallel relationship measured longitudinally of the frame, there being parallel vertical side walls projecting upwardly from opposite sides of said frame between and on which said guides are provided, each pair of guides defining a pair of vertical slots in register transversely of said frame, each defined by a pair of spaced inwardly projecting guide walls, one of which is wider than the other and extends upwardly appreciably beyond the end of the other for a two-way feel in the dark to assist the operator in entering the ends of the paper holder in the transversely registering slots.

8. In an apparatus for the enlarging of photographs comprising a horizontal elongated frame, and projector means on one end portion, including a light converging lens in a projector housing with a light source and means for mounting a film supporting slide in the housing between the lens and light source, the improvement which consists in the provision of a pair of guides for reception of the opposite ends of a sensitized paper holder on the other end portion of said frame, there being parallel vertical side walls projecting upwardly from opposite sides of said frame between and on which said pair of guides is provided, said pair of guides defining a pair of vertical slots in register transversely of said frame each defined by a pair of spaced inwardly projecting guide walls, one of which is wider than the other and extends upwardly appreciably beyond the end of the other for a two-way feel in the dark to assist the operator in entering the ends of the paper holder in the transversely registering slots.

9. In an apparatus for the enlarging of photographs, the combination of an elongated substantially horizontal frame of molded plastic material having an open top light box molded integral with and supporting one end and downwardly extending legs molded integral with and supporting the other end, the latter end having parallel vertical side walls molded integral therewith and projecting upwardly therefrom, vertical guides for mounting sensitized paper, said guides defined on the inner sides of said side walls in a predetermined spaced parallel relation measured longitudinally of said frame, each pair of guides defining a pair of vertical slots in register transversely of siad frame, each guide being defined by a pair of spaced inwardly projecting guide walls, one of which is wider than the other and extends upwardly appreciably beyond the end of the other for a two-way feel in the dark to assist the operator in entering the ends of the paper holder in the transversely registering slots, a light bulb and reflector mounted in said light box, a projector housing mounted on the light box over the frame and projecting toward the vertical guides having means to mount a film slide therein and having a light converging lens in front of said means, and a cover for the light box detachably secured in place thereon.

10. In an apparatus for the enlarging of photographs, comprising an elongated substantially horizontal frame having an open top light box supporting one end and downwardly extending legs supporting the other end, the latter end having parallel vertical side walls projecting upwardly therefrom, vertical guides for mounting sensitized paper, said guides defined on the inner sides of said side walls in a predetermined spaced parallel relation measured longitudinally of said frame, a vertically disposed light bulb and a reflector mounted substantially vertically therebehind in said light box, a projector housing mounted on the light box over the frame and projecting horizontally toward the vertical guides having means to mount a film slide therein and having a light converging lens in front of said means, and a cover for the open top of said light box detachably secured in place thereon, the improvement which consists in the cover having a top wall in which ventilation holes are provided enabling circulation of air around the light bulb and reflector, a plate mounted substantially horizontally in said cover in spaced parallel relation to said top wall to serve both as a light shield preventing escape of light through the ventilation holes and as a light reflector, and a bowed generally U-shaped contractile type spring wire clip mounted at its opposite ends on said plate and projecting downwarrdly therefrom to receive the light bulb between the arms thereof, thereby drawing the cover resiliently downwardly onto said light box to prevent escape of light therebetween.

References Cited

UNITED STATES PATENTS

| | | | |
|---|---|---|---|
| 1,141,885 | 6/1915 | Palmer | 88—26 |
| 1,157,742 | 10/1915 | White | 88—24 |
| 1,527,883 | 2/1925 | Lare et al. | 88—24 |
| 2,603,125 | 7/1952 | Evers | 88—24 |
| 3,148,583 | 9/1964 | Maiershofer | 248—11 X |

NORTON ANSHER, *Primary Examiner.*

F. L. BRAUN, *Assistant Examiner.*